(12) United States Patent
Fernandes

(10) Patent No.: US 7,318,179 B1
(45) Date of Patent: *Jan. 8, 2008

(54) VIRTUAL ROUTING SYSTEM FOR REAL-TIME NETWORK APPLICATIONS

(75) Inventor: Flavio Fernandes, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 11/386,118

(22) Filed: Mar. 22, 2006

Related U.S. Application Data

(63) Continuation of application No. 10/322,829, filed on Dec. 18, 2002, now Pat. No. 7,036,051.

(51) Int. Cl.
*G06F 11/00* (2006.01)

(52) U.S. Cl. .................................................. 714/55
(58) Field of Classification Search ................ 714/55; 709/223, 224

See application file for complete search history.

(56) References Cited

U.S. PATENT DOCUMENTS

| | | | | |
|---|---|---|---|---|
| 5,832,197 | A * | 11/1998 | Houji ........................... | 714/4 |
| 5,963,540 | A * | 10/1999 | Bhaskaran ................... | 370/218 |
| 6,148,410 | A * | 11/2000 | Baskey et al. ................ | 714/4 |
| 6,148,411 | A * | 11/2000 | Ichinohe et al. ............. | 714/4 |
| 6,295,275 | B1 * | 9/2001 | Croslin ........................ | 370/216 |
| 6,519,224 | B2 * | 2/2003 | Hrastar et al. ............... | 370/227 |
| 6,674,726 | B1 * | 1/2004 | Kado et al. .................. | 370/253 |
| 6,728,779 | B1 * | 4/2004 | Griffin et al. ................ | 709/239 |
| 6,802,020 | B1 * | 10/2004 | Smith ............................ | 714/4 |
| 6,822,974 | B1 * | 11/2004 | Vaidya ........................ | 370/512 |
| 6,910,148 | B1 * | 6/2005 | Ho et al. ....................... | 714/4 |
| 6,954,436 | B1 | 10/2005 | Yip et al. | |

OTHER PUBLICATIONS

Scalable Fault Tolerant Network Design Ethernet based Wide Area Process Control Network Systems by Sejun Song and Baeck Young Choi. sjsong@cisco.com & choiby@cs.umn.edu.
www.juniper.net/techpubs/software/junos/junos62/swconfig62-interfaces/download/swconfig62-interfaces.pdf.

* cited by examiner

*Primary Examiner*—Robert Beausoliel
*Assistant Examiner*—Amine Riad
(74) *Attorney, Agent, or Firm*—Shumaker & Sieffert, P.A.

(57) ABSTRACT

A virtual routing system includes a number of physical routers. One of the physical routers is the master with respect to a given source of traffic, and the others are backups. If the master router fails, then one of the backup routers becomes the master to provide substantially uninterrupted service through the virtual routing system. A virtual redundant routing protocol (VRRP) can be extended to support sub-second advertising of VRRP packets by a master router a backup router. In some cases, sub-second switching is supported, in which a backup router can become a new master router after less than a second of down time by the original master router. Such responsiveness in a virtual routing system is very useful for many applications, such as voice-over-packet applications in which down time of the routing system for more than one second is unacceptable.

7 Claims, 7 Drawing Sheets

VIRTUAL ROUTING SYSTEM FOR REAL-TIME NETWORK APPLICATIONS

CROSS REFERENCE TO RELATED APPLICATIONS

This application is a continuation of U.S. application Ser. No. 10/322,829, filed Dec. 18, 2002, now U.S. Pat. No. 7,036,051 the entire contents of which is incorporated herein by reference.

TECHNICAL FIELD

The invention relates to computer networks and, more particularly, to techniques for detecting and responding to failures of network devices within such networks.

BACKGROUND

Virtual router redundancy protocols (VRRPs) allow several routers on a multi-access link to utilize the same virtual internet protocol (IP) address. One example of a VRRP is described in the Request for Comment (RFC) document series, document number RFC 2338. In accordance with the VRRP, one of the routers is selected as a master, while the other routers act as backup routers in the case of failure of the master router. Thus, several routers share a virtual IP address and media access control (MAC) address to form a "virtual routing system," that consists of the several physical routers. Computers connected to the virtual routing system view the system as a single device, i.e., a signal router.

The particular physical router selected as the master at any given time performs routing of network packets through the virtual routing system. If the master router fails, however, one of the backup physical routers can be selected as a new master router so that routing through the virtual routing system can continue without significant interruption. VRRP eliminates single points of failure in network settings by providing a protocol that supports redundant router connections.

In many cases, VRRP allows for load sharing, in which different redundant routers are assigned as the master for different computers coupled to the virtual routing system. In that case, each redundant physical router of the virtual routing system carries traffic, but if one of the redundant physical routers fails, another of the redundant physical routers can be assigned the traffic of the failed router. In other words, when load sharing is used, different redundant physical routers operate as masters with respect to traffic received from different sources. Load sharing can improve throughput through the virtual routing system by utilizing the capabilities of each redundant physical router, while still providing the ability to adapt to failures of one of the physical routers.

SUMMARY

In general, the invention is directed to a virtual routing system that includes a number of physical routers, the individual routers that make up such a system, and various techniques executed by the routers in a virtual routing system. In accordance with the invention, a virtual redundant routing protocol (VRRP) may be defined to allow for sub-second advertising intervals. Moreover, the VRRP may support sub-second switching between a master router and a backup router.

In a virtual routing system, one of the physical routers is the master with respect to a given source of traffic, and the others are backups. If the master router fails, then one of the backup routers becomes the master to provide substantially uninterrupted service through the virtual routing system. In accordance with the invention, a backup router may become a new master router after less than a second of down time by the original master router. Such responsiveness in a virtual routing system is very useful for certain applications, such as voice-over-packet applications or other applications in which down time of the routing system for more than one second is unacceptable.

In one embodiment, a method comprises receiving timing information that specifies a time interval between successive transmissions of packets in accordance with a network protocol, and detecting a failure of a network device using a time interval not defined by the network protocol when the time value specified by the timing information is not defined by the network protocol.

In another embodiment, a method comprises receiving information according to a VRRP, and interpreting the information as indicating a time interval between successive transmissions of VRRP packets of less than one second.

In another embodiment, a method comprises generating a VRRP packet to include a zero in an advertisement interval field, and transmitting the VRRP packet to indicate a time interval between successive VRRP packet transmissions of less than one second.

In another embodiment, a router comprises an interface to receive timing information that specifies a time value between successive transmissions of packets in accordance with a network protocol, and a control unit to detect a failure of a network device using a time interval not defined by the network protocol when the time value specified by the timing information is not defined by the network protocol.

In another embodiment, a router comprises an interface to receive information according to a VRRP, and a controller to interpret the information as indicating a time interval between successive transmissions of VRRP packets of less than one second.

In another embodiment, a router comprises a controller to generate a VRRP packet to include a zero in an advertisement interval field, and an interface to transmit the VRRP packet to indicate a time interval between successive VRRP packet transmissions of less than one second.

In another embodiment, a virtual router system comprises a first router to transmit timing information that specifies a time value between successive transmissions of packets in accordance with a network protocol, and a second router to detect failures of a network device using a time interval not defined by the network protocol when the time value specified by the timing information is not defined by the network protocol.

In another embodiment, a virtual router system comprises a first router to transmit information according to a virtual router redundancy protocol VRRP, and a second router to receive the information and interpret the information as indicating a time interval between successive transmissions of VRRP packets of less than one second.

In another embodiment, a computer readable medium comprises instructions that when executed in a router cause the router to generate a VRRP packet to include a zero in an advertisement interval field, and transmit the VRRP packet to indicate a time interval between successive VRRP packet transmissions of less than one second.

In another embodiment, a computer readable medium comprises instructions that when executed in a router that receives information according to a VRRP, causes the router to interpret the information as indicating a time interval between successive transmissions of VRRP packets of less than one second.

In another embodiment, a computer-readable medium comprises a data structure including a number of fields, wherein an advertisement interval field defines a zero value that indicates a time interval between successive VRRP transmissions of less than one second.

The different embodiments may be capable of providing a number of advantages. In general, a virtual routing system operating in accordance with the principles of the invention may provide advantages in terms of improved redundancy and avoidance of down time in a networked setting. More specifically, the invention can provide improved responsiveness in a virtual routing system by supporting advertisement intervals of less than one second. In many cases, sub-second switching between a master router and a backup router can also be achieved, e.g., by defining the advertisement intervals small enough so that an integer number of intervals is still less than one second. Such responsiveness in a virtual routing system can be very useful for many applications, including voice-over-packet applications in which down time of the routing system for more than one second is unacceptable. For example, virtual router switching after less than 500 milliseconds may allow for redundant real-time voice-over-packet applications to be supported by a virtual routing system.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
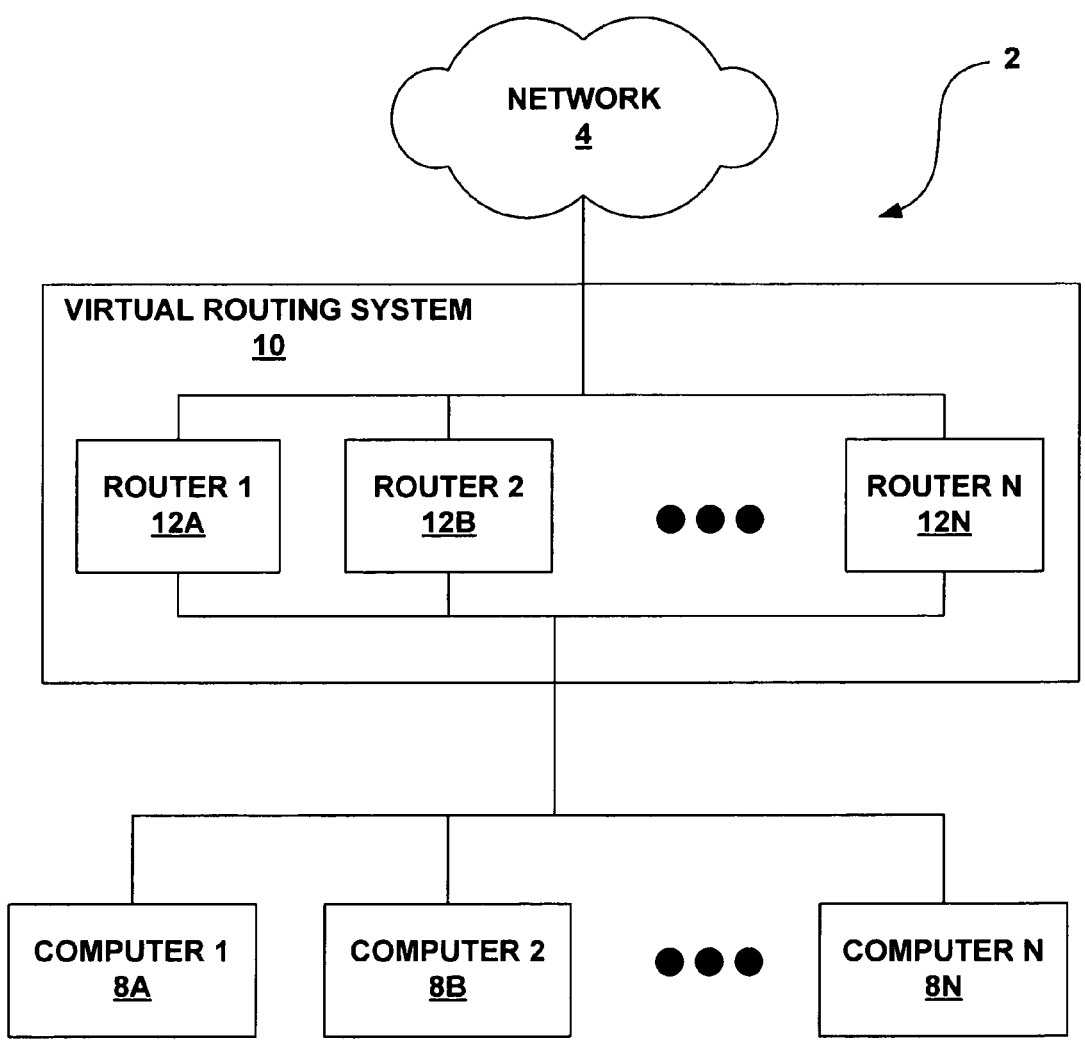
FIG. 1 is a block diagram of a networked system including a network and various host computers coupled to the network via a virtual routing system.

The invention is directed to a virtual routing system that includes a number of physical routers, the individual routers that make up such a system, and various techniques executed by the routers in a virtual routing system. In a virtual routing system, one of the physical routers is the master with respect to a given source of traffic, and the others are backups. If the master router fails, then one of the backup routers becomes the master to provide uninterrupted service through the virtual routing system. As outlined in greater detail below, certain parameters can be defined in a virtual redundant routing protocol (VRRP) in order to support sub-second advertising of VRRP packets by the master router to the backup routers. Moreover, sub-second switching between a master router and a backup router may be supported, in which case the backup router can become a new master router after less than a second of down time by the original master router. Such responsiveness can improve the virtual routing system, and can allow applications such as voice-over-packet applications to be redundantly supported by the system.

In one example, the VRRP used within the virtual routing system corresponds substantially to the protocol defined in the Request for Comment (RFC) document series, document number RFC 2338. In RFC 2338, a VRRP packet format is defined for transmission from the master router to the backup routers in a virtual routing system. In RFC 2338, however, VRRP packets are sent in intervals of integer seconds, and switching between a master router and a backup router occurs when a predefined number of intervals, e.g., three intervals, have elapsed without receiving a VRRP packet. Specifically, the advertisement interval can be set to an integer value up to 255 seconds, with a value of one second used as a default. Consequently, the VRRP described in RFC 2338 is not designed to support sub-second switching between a master router and a backup router following failure of the master router. Down time of a second or greater, however, is unacceptable for many settings, such as voice-over-packet settings that support real-time voice communication.

In accordance with the principles of the invention, an extension or modification to the RFC 2338 protocol can be used to allow for sub-second switching between a master router and a backup router following failure of the master router. For example, an extension may allow routers within a virtual routing system to comply with RFC 2338 when second intervals are used. In addition, the routers may invoke sub-second intervals if the virtual routing system includes other routers that recognize the extension to the protocol.

More specifically, the routers within the virtual routing system may set the advertisement interval to zero to indicate that an agreed-upon sub-second advertisement time interval should be used. In other words, the routers in the virtual routing system can be configured or programmed to interpret the zero value in the advertisement interval of a VRRP packet to require a sub-second interval. For example, the routers may be configured to utilize an interval of 166 milliseconds or other defined sub-second interval when a zero value is detected for the advertisement interval. In the case of an interval of 166 milliseconds, if switching were defined to occur after three intervals, switching would occur after approximately 500 milliseconds, which may be acceptable for voice-over-packet applications.

FIG. 1 is a block diagram of a networked system 2, including a network 4, and various host computers 8A-8N (collectively computers 8). Network 4 may represent an autonomous system or any network topography to which computers 8 can be attached. Virtual routing system 10 provides a point of attachment for computers 8 to network 4. Computers 8 may view virtual routing system 10 as a single device, i.e., a single router. More specifically, a common virtual internet protocol (IP) address and media access control (MAC) address can be assigned to virtual routing system 10 so computers 8 are able to send packets through virtual routing system 10 using the common address.

Virtual routing system 10 includes a number of routers 12A-12N (collectively routers 12). Any plurality of routers may be used, e.g., two or more, to provide redundancy to virtual routing system 10. In accordance with the VRRP, one of routers 12 is initially elected to act as a master, and the others of routers 12 operate as backup routers. If the master router fails, however, one of the backups is elected to take over as master in order to avoid significant interruption of service through virtual routing system 10. Priority values can be assigned to each of routers 12 to coordinate which router is the master, i.e., the one with the highest priority. If the highest priority router fails, the next highest priority router takes over.

In some cases, virtual routing system 10 can be configured to load share network traffic. In that case, different ones of routers 12 operate as the master for routing traffic received from different ones of computers 8. When load sharing is used, each of routers 12 carries a portion of the network traffic, but if one of routers 12 fails, another of routers 12 can be assigned to route the traffic of the failed router. In other words, when load sharing is used, different physical routers 12 operate as masters for routing traffic received from different sources, e.g., different computers 8. Load sharing can improve throughput through virtual routing system 10 by utilizing the capabilities of all of routers 12, while still providing the ability to adapt to failures of one of routers 12. When load sharing is used, each of routers 12 may have a different priority with respect to traffic received from different computers 8.

Routers 12 communicate with one another according to a VRRP, such as the protocol substantially defined in document RFC 2338. The VRRP allows routers 12 to coordinate operation to provide substantially seamless and redundant routing capabilities. Certain parameters can be defined in the VRRP in order to support sub-second switching between a master router and a backup router. Thus, the backup router can become a new master router after less than a second of down time by the original master router, which can improve performance of virtual routing system 10.

Figure 2:
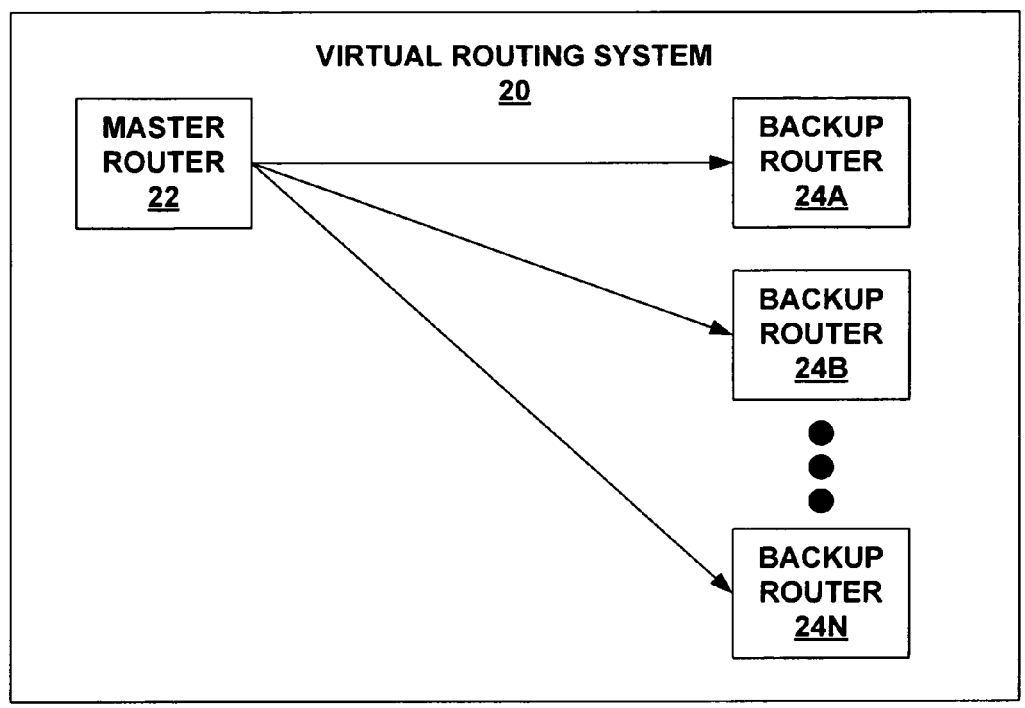
FIG. 2 is a block diagram of an exemplary virtual routing system.

FIG. 2 is a block diagram of an example virtual routing system 20, which may correspond to virtual routing system 10 of FIG. 1. As shown in FIG. 2, virtual routing system 20 includes a master router 22, and one or more backup routers 24A-24N. As mentioned above, however, if load sharing is used, any of routers 22, 24 of virtual system 20 may be a master with respect to some sources of network traffic and a backup with respect to others.

In any case, master router 22 sends information to backup routers 24 via VRRP, such as that substantially defined in RFC 2338. Although described in reference to VRRP, other protocols, however, may also be extended or modified in accordance with the invention. For example, the techniques may be applied to any protocol that makes use of periodic messages, such as so called "keep-alive" or "heartbeat" messages, to indicate the presence and operational state of a network device. In particular, the techniques may be applied to any network protocol that defines an integer time interval between transmissions of such messages.

Master router 22 may generate VRRP packets, and periodically transmit the VRRP packets to backup routers 24. Receipt of such messages indicates to backup routers 24 that master router 22 is functioning properly. For this reason, the periodic transmission of VRRP packets from master router 22 to backup routers 24 is sometimes referred to as a "heartbeat" of master router 22.

The time interval between successive transmissions of VRRP packets, i.e., the rate of master router's 22 "heartbeat," is defined within the VRRP packets. In particular, the VRRP packets may include an advertisement interval field that indicates the time interval between successive transmissions. According to RFC 2338, the time interval specified in the advertisement interval is defined in integer seconds. Accordingly, strict compliance with RFC 2338 only allows for transmissions separated by an integer number of seconds.

Upon receiving a VRRP packet, each of backup routers 24 examines the packet, and identifies the specified advertisement interval. Backup routers 24 then listen for subsequent packets, expected at times defined by the advertisement interval. If backup routers 24 do not receive a VRRP packet over the course of an integer number of advertisement intervals, e.g., three intervals, then one of backup routers 24 is elected to operate as the master router in replace of master router 22.

For example, if the advertisement interval within a VRRP packet has a value of one second, one of backup routers 24 may assume the role of the master if a VRRP packet is not received after an integer number of one second intervals have elapsed, e.g., after three seconds. In that case, because the VRRP packets have not been received, i.e., the heartbeat of the master router has not been detected, backup routers 24 assume that master router 22 is not functioning properly. At that time, the one of backup routers 24 having the next highest priority may assume the role of the master router. As described in greater detail below consistent with the principles of the invention, the advertisement interval can be made less than one second for improved responsiveness.

Figure 3:
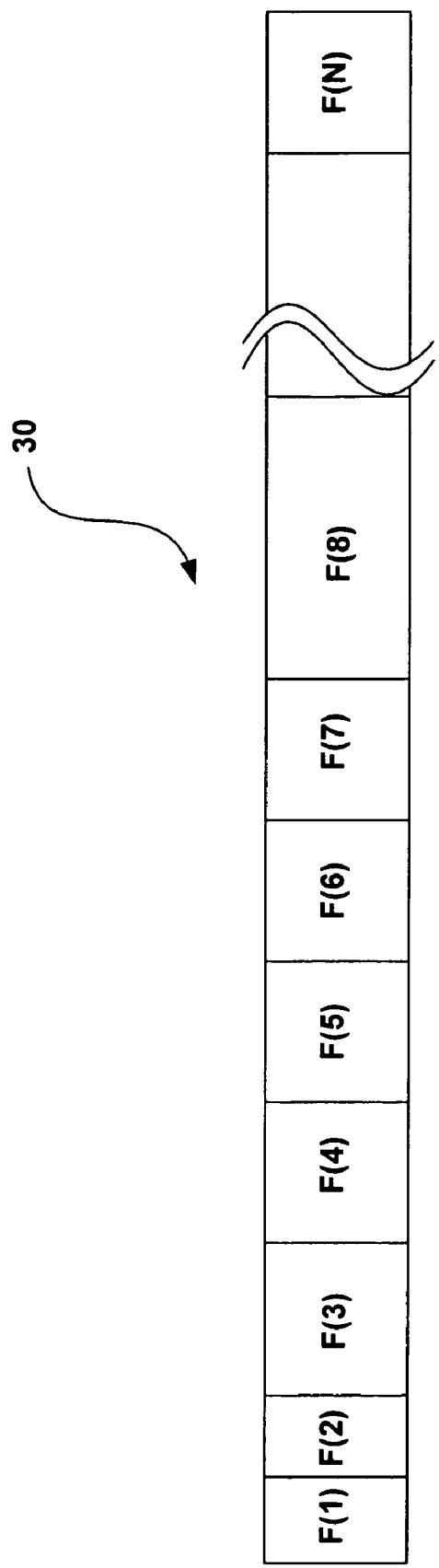
FIG. 3 is an exemplary data structure according to an embodiment the invention.

FIG. 3 is an exemplary data structure of a VRRP packet according to an embodiment the invention. For example, the data structure of FIG. 3 may comprise a VRRP packet 30 that includes a number of fields [F(1)-F(N)]. By way of example, field F(1) may be a four-bit field that specifies the version of the VRRP protocol used by packet 30. Field F(2) may be a four-bit field that specifies the type of packet 30, e.g., to specify that packet 30 is an advertisement packet that serves as the "heartbeat" of master router 22. Field F(3) may be an eight-bit field that specifies virtual routing system for which packet 30 is reporting. Field F(4) may be an eight-bit field that specifies the sending router's priority in the virtual routing system. Field F(5) may be an eight-bit field that specifies the number of IP addresses contained in the packet. Field F(6) may be an eight-bit field that specifies any authentication methods being utilized by packet 30.

Field F(7) may be an eight-bit field that specifies the advertisement interval. Again, the advertisement interval is the time interval between successive transmissions of VRRP packets, i.e., the heartbeat rate of master router 22. According to RFC 2338, the time interval specified in the advertisement interval is defined in units of seconds. Accordingly, strict compliance with RFC 2338 only allows for transmissions separated by an integer number of seconds.

In accordance with the principles of the invention, however, the advertisement interval, e.g., field F(7) can be defined and interpreted by the routers of virtual routing system 20 to specify a sub-second interval. In one example, routers in virtual routing system 20 can interpret a zero value as specifying a pre-configured interval of less than one second. In contrast, if strict compliance with RFC 2338 were observed, a value of zero in field F(7) would specify an undefined interval. In general, in accordance with the principles of the invention, a value not defined by a networking protocol (such as zero value in field F(7) of a packet conforming to the RFC 2338 protocol) can be assigned meaning that is consistent with the operation of the protocol.

By configuring the various different routers of virtual routing system 20 to recognize and interpret a value of zero in field F(7) as specifying a sub-second interval, advertisement intervals less than one second can be achieved. As mentioned, sub-second intervals are specifically desirable when real-time transmissions, such as voice-over-packet applications, are supported. As one example, the pre-configured sub-second interval may be selected to be approximately 166 milliseconds. In that case, if switching to a backup router in virtual routing system 20 were defined to occur after three intervals of not receiving a VRRP packet, switching would occur after approximately 500 milliseconds, which may be acceptable voice-over-packet applications.

In other examples, the VRRP protocol may be modified so that units of field F(7) are in milliseconds, tens of milliseconds, hundreds of milliseconds, or the like. Alternatively, specific non-zero values in the advertising interval field may be assigned specific sub-second values via programming or otherwise configuring such values into the routers of the virtual routing systems. In those cases, however, the VRRP protocol would not be compliant with RFC 2338. In contrast, an extension of the RFC 2338 protocol in which the zero value for field F(7) indicates a sub-second interval may still allow the routers to operate in other systems that have strict compliance with RFC 2338.

Referring again to FIG. 3, Field F(8) may be an sixteen-bit field that specifies the checksum, i.e., a value used to detect whether data corruption occurred. The remaining fields may include various thirty-two-bit fields listing the IP addresses that are associated with the virtual routing system. As mentioned above, the number of IP addresses included in packet 30 is specified in field F(5), the count IP addresses field. Finally, one or more fields may be included to define authentication data. Other fields may also be defined, if desired.

Figure 4:
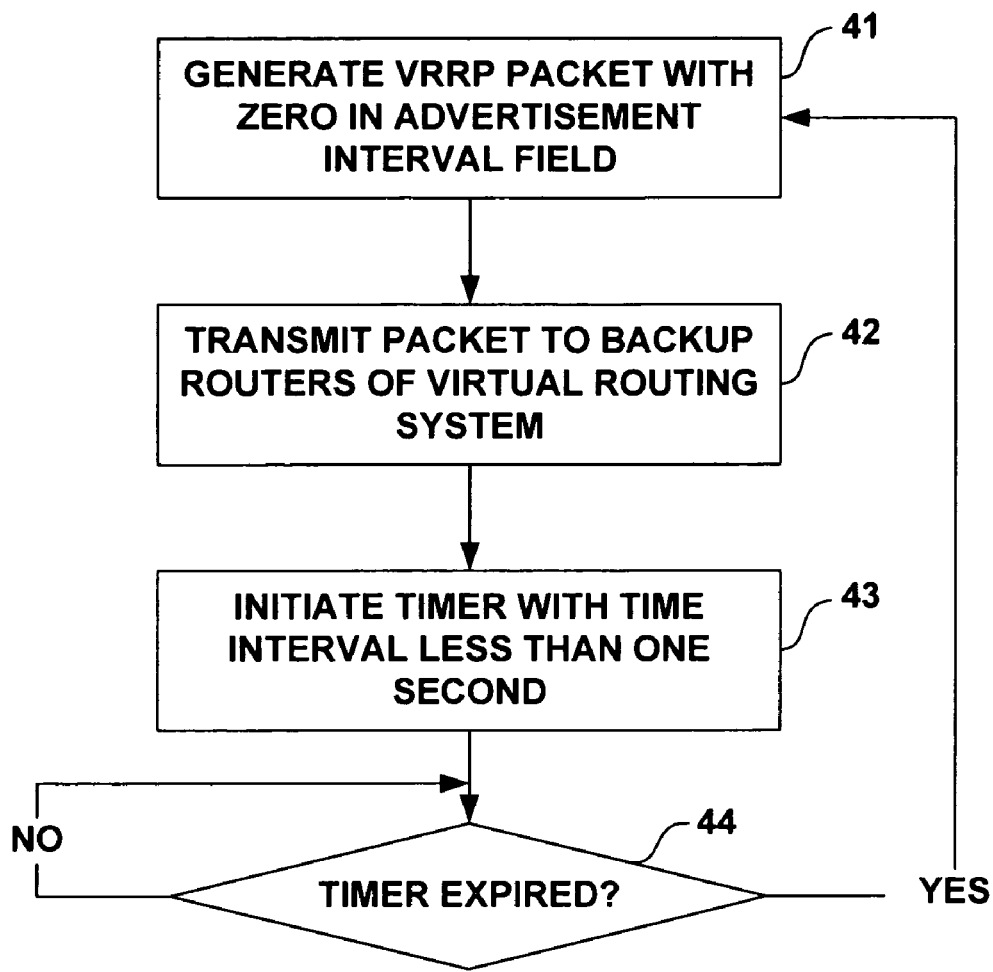
FIG. 4 is a flow diagram illustrating execution of certain techniques from the perspective of a master router of a virtual routing system.

FIG. 4 is a flow diagram according to an embodiment of the invention. In particular, FIG. 4 illustrates execution of certain techniques from the perspective of master router 22 of virtual routing system 20. As shown in FIG. 4, master router 22 generates a VRRP packet with a zero in the advertisement interval field (41), and transmits the packet to backup routers 24 of virtual routing system 20 (42). In accordance with the invention, backup routers 24 can interpret the zero in the advertisement interval field to indicate a pre-configured time interval of less than one second. The time interval may be selected to be small enough to ensure that real-time packet transmissions through virtual routing system 20 can be supported even if master router 22 fails, and one of backup routers 24 replaces master router 22 as the master.

In one case, master router 22 generates the VRRP packet with a zero in the advertisement interval field by identifying an interval in microseconds and performing an integer division by 1000. In that case, if the interval is configured to have a value less than 1000 microseconds, master router 22 sets the advertisement interval field in the VRRP packet to zero. The other routers may be pre-configured to know the sub-second interval associated with a zero value in the advertisement interval field.

Such a technique has the added advantage of being fully compatible with RFC 2338, in that if an integer number of seconds is desired for the interval (rather than a sub-second interval), the integer number could be generated in a similar fashion (by dividing the interval in milliseconds by 1000) and then transmitted to backup routers 24 in accordance with RFC 2338. Thus, a router that can define a zero value in the advertisement interval field to indicate a sub-second interval may still be fully compatible for use in a virtual routing system with other routers programmed for strict compliance with RFC 2338. If the router were used in a strict RFC 2338 system, the router could still perform an integer divide by 1000 on the desired interval to generate a value for the advertisement interval, but sub-second intervals could not be used since other routers configured for strict compliance with RFC 2338 would not know how to interpret a zero in the advertisement interval field.

After generating (41) and transmitting (42) the VRRP packet, master router 22 initiates a timer with the time interval specified in the VRRP packet, e.g., being less than one second as described herein (43). Once the timer has expired (44), master router generates (41) and transmits (42) another VRRP packet to the backup routers 24. In this manner, transmission of VRRP packets acts like a heartbeat of master router 22 that can be detected by backup routers 24. Thus, if the heartbeat stops, e.g., transmission of the VRRP packets cease for a specified integer number of time intervals, one of backup routers 24 can become the master router. Importantly, the rate of the "heartbeat" is faster than one beat per second.

Figure 5:
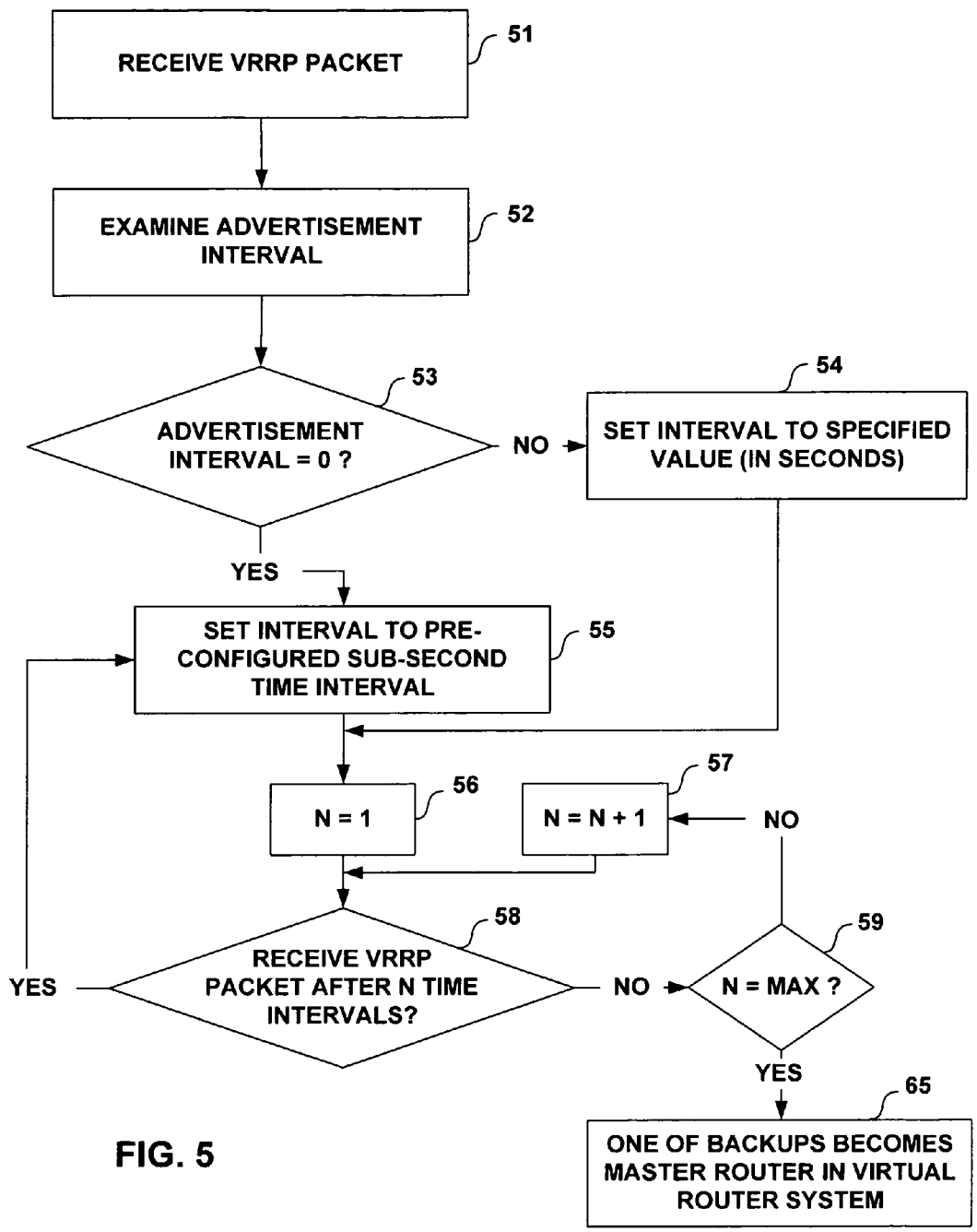
FIG. 5 is a flow diagram illustrating execution of certain techniques from the perspective of a backup router of a virtual routing system.

FIG. 5 is another flow diagram according to an embodiment of the invention. FIG. 5 illustrates execution of certain techniques from the perspective of one or more of backup routers 24 of virtual routing system 20. As shown in FIG. 5, backup routers 24 receive a VRRP packet (or similar information) from master router 22 (51). Backup routers 24 then examine the advertisement interval in the VRRP packet (52). If the advertisement interval has a non-zero value (no branch of 53), then backup routers 24 set the time interval to the specified value (in seconds) as provided in the advertisement interval (54). However, if the advertisement interval is set to zero, then backup routers 24 set the time interval to a pre-configured sub-second time interval (55).

Backup routers 24 then listen for subsequent VRRP packets, and count integer numbers of the time intervals if subsequent VRRP packets are not received. For example, a count N may be initialized to one (56) after receiving a first VRRP packet, but then incremented (57) if VRRP packets are not received during the expected time intervals (no branch of 58). If a predetermined maximum number of intervals (MAX), e.g., three intervals, are counted by backup routers 24 without receiving a VRRP packet (yes branch of 59), then one of backup routers 24 becomes a new master router in virtual routing system 20 (65). In particular, the one of backup routers 24 assigned the highest priority can become the master, because absence of reception of VRRP packets from master router 22 for three time intervals indicates that master router 22 is not functioning.

Importantly, an interval defined to be less than one second can improve responsiveness in virtual routing system 20. As described herein, a pre-configured sub-second interval can be defined by selecting a zero value in the advertisement interval field of a VRRP packet and configuring the routers of system 20 to interpret the zero value as defining a pre-configured sub-second interval. Moreover, an integer number of intervals, e.g., three intervals in the illustrated example of FIG. 5, may correspond to an acceptable amount of down time in virtual routing system. For example, if voice-over-packet applications are to be redundantly supported, then the sub-second time interval may be selected such that the integer number of time intervals needed to invoke a router replacement in virtual routing system 20 is collectively less than approximately 500 milliseconds. Thus, if the integer is three, then the sub-second time interval may be defined to be less than 166 milliseconds in order to ensure redundant voice-over-packet applications can be supported in real-time.

Figure 6:
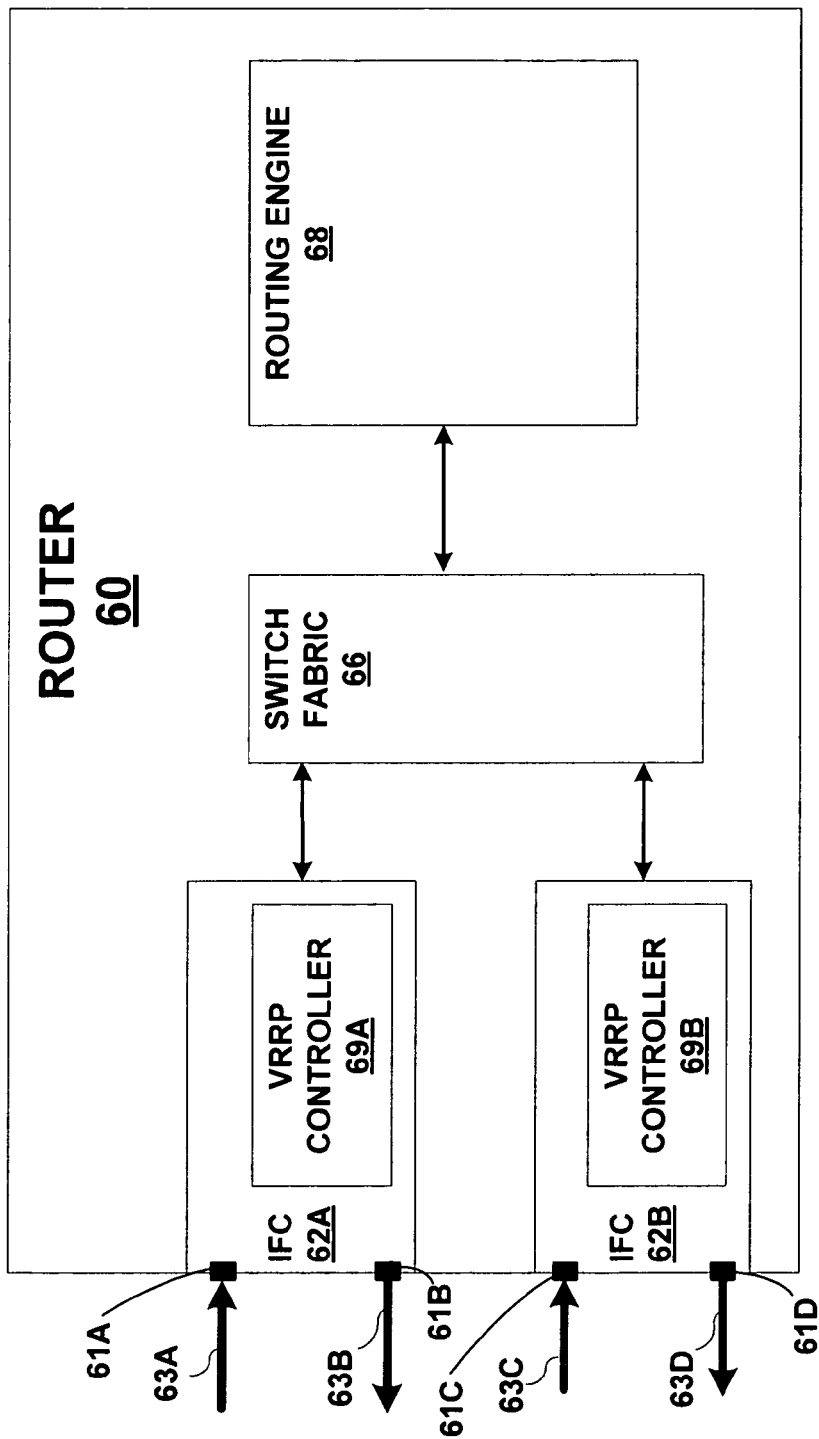
FIGS. 6 and 7 are block diagrams of exemplary routers according to embodiments of the invention.

FIG. 6 is a block diagram illustrating an example embodiment of router 60 that may comprise a master router or a backup router of a virtual routing system in accordance with the invention. In the embodiment of FIG. 6, router 60 is configured with interface cards (IFCs) 62A, 62B (collectively IFCs 62). Although illustrated with two IFCs 62, any number of IFCs may be supported by router 60. For example, IFCs 62 may be removably inserted into a chassis of router 60. The use of IFCs 62 can provide scalability to router 60, and may allow different types of network interfaces to be supported. Each of IFCs 62 may include interfaces 61, such as in-bound and out-bound ports for receiving and transmitting signals over communication links 63A-63D. Communication links 63A-63D may be uni-directional optical signals, although the invention is not limited in that respect.

Router 60 receives inbound packets via inbound interfaces 61A, 61C of IFCs 62, and transmits outbound packets via outbound interfaces 61B, 61D. For most packets sent through router 60, the packets pass through switch fabric 66 to routing engine 68, where the packet is analyzed and a forwarding next hop (FNH) for the packet is determined. A FNH generally refers to a neighboring router physically coupled to a source router along a given route. For example, the FNH for a route may specify a physical interface and MAC address for the interface associated with the next router along the FNH.

Alternatively, a certain block of data, referred to as the "key," of the packet may be forwarded to routing engine 68 to determine the FNH. In any case, routing engine 68 identifies an outgoing interface associated with the FNH of the packet, and router 60 sends the packet via the identified outgoing interface.

Router 60 includes one or more VRRP controllers 69A, 69B (collectively VRRP controllers 69) for managing VRRP in accordance with the invention. In the example of FIG. 6, VRRP controllers 69 reside in IFCs 62A and 62B respectively, although the invention is not limited in that respect. If router 60 is a master router of a virtual routing system, VRRP controllers 69 coordinate generation and transmission of VRRP packets as described above with reference to FIG. 4. If router 60 is a backup router of a virtual routing system, VRRP controllers 69 coordinate reception and analysis of VRRP packets, and possibly router switching as described above with reference to FIG. 5. In either case, VRRP controllers 69 can be programmed to operate in accordance with sub-second advertisement intervals as described herein. By way of example, VRRP controllers 69 may be embodied in hardware, software, firmware, or various combinations. If embodied in software, VRRP controller 69 may include computer readable instructions stored on a computer readable medium, that when executed in router 60 perform one or more of the techniques described herein.

Figure 7:
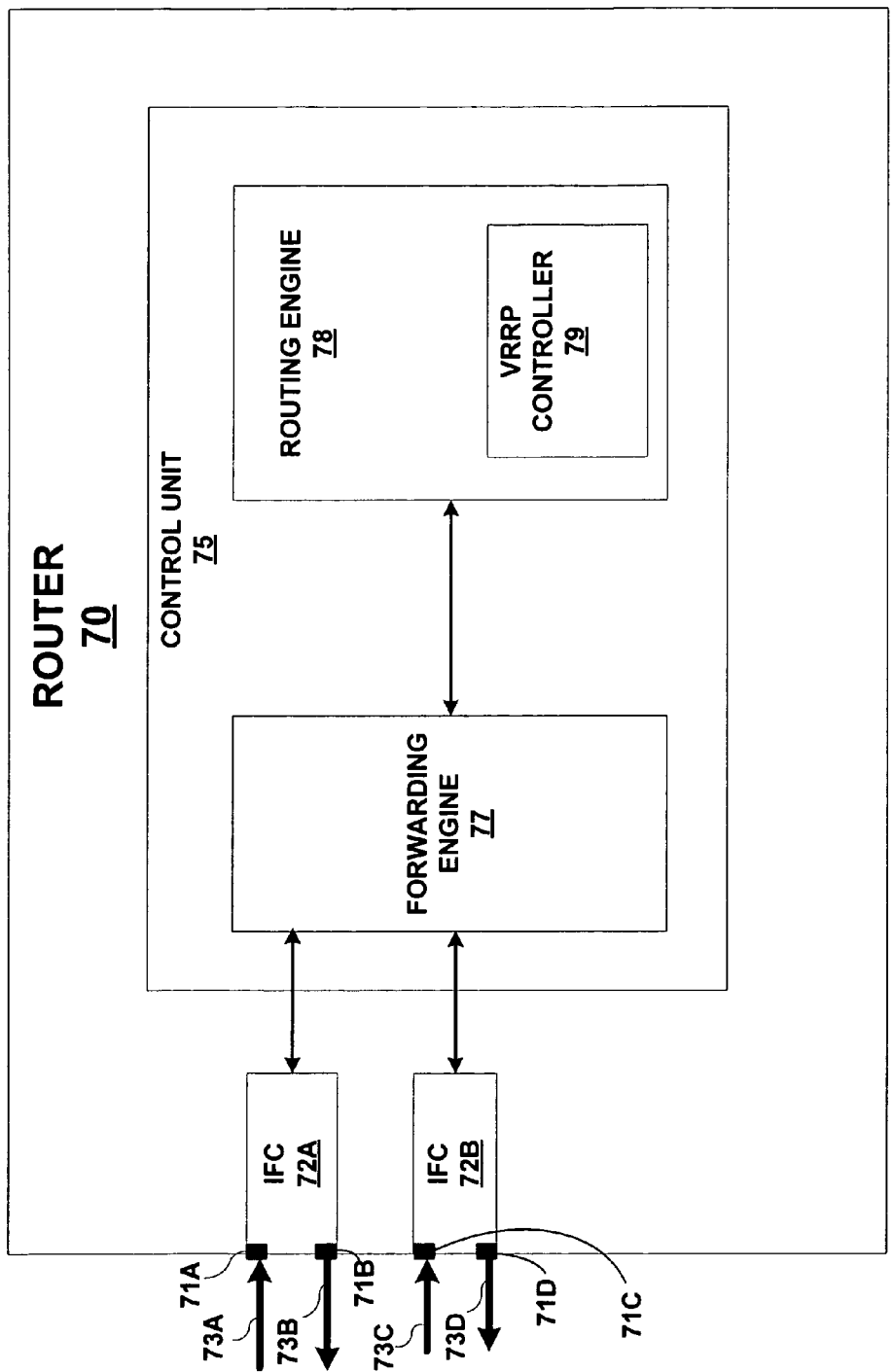

FIG. 7 illustrates an alternative embodiment of a router 70 that operates in accordance with the principles of the invention. Like router 60 of FIG. 6, router 70 of FIG. 7 includes IFCs 72A, 72B. However, in router 70 VRRP controller 79 resides in routing engine 78, and may be implemented as a software process stored on a computer-readable medium, firmware, hardware, or combinations thereof.

Control unit 75 and the various components of router 70 may comprise one or more processors, discrete hardware circuitry, firmware, software executing on a programmable processor, or a combination of any of the above. In any case, control unit 75 of router 70 directs inbound packets received over inbound links 73A, 73C via interfaces 71A, 71C of IFCs 72, to an appropriate outbound interface 71B, 71D of IFCs 72 so that the packets can be sent to a FNH via outbound links 73B, 73D. Control unit 75 controls the routing and general functionality of router 70. In the illustrated exemplary embodiment, the functionality of control unit 75 can be divided between a routing engine 78 and a packet-forwarding engine 77.

Routing engine 78 may be primarily responsible for maintaining routing information to reflect the current network topology. In order to maintain an accurate representation of the network, router 70 may support a number of protocols for exchanging routing information with other routers. For example, router 70 may support the Border Gateway Protocol (BGP), for exchanging routing information with routers of other autonomous systems. Similarly, router 70 may support the Intermediate System to Intermediate System (IS-IS) protocol, which is an interior gateway routing protocol for communicating link-state information within an autonomous system. Other examples of interior routing protocols include the Open Shortest Path First (OSPF), and the Routing Information Protocol (RIP).

Routing engine 78 directs packet-forwarding engine 77 to maintain forwarding information in accordance with routing information stored and periodically updated in routing engine 78. Forwarding engine 77 associates packet information, e.g., the key of each packet, with specific FNHs.

Router 70 includes VRRP controller 79 to manage VRRP in accordance with the invention. In particular, VRRP controller 79 manages the generation and interpretation of VRRP packets sent to and from router 79. In the example of FIG. 7, VRRP controller 79 reside in routing engine 78, although the invention is not limited in that respect. In other embodiments, VRRP controller 79 may reside in forwarding engine 77, or may be a separate component, if desired. Also a VRRP controller 79 may reside in one or more IFCs 72 similar to the embodiment illustrated in FIG. 6. If router 70 is a master router of a virtual routing system, VRRP controller 79 coordinates generation and transmission of VRRP packets as described above with reference to FIG. 4. If router 79 is a backup router of a virtual routing system, VRRP controller 79 coordinates reception and analysis of VRRP packets, and possibly router switching, as described above with reference to FIG. 5. In any case, VRRP controller 79 can be programmed to interpret sub-second intervals as described herein.

A number of embodiments have been described. In particular, VRRP techniques have been described which allow a time interval between successive transmissions of VRRP packets to be less than one second. The described techniques may assign a sub-second advertisement interval when a zero value is specified in the advertisement interval field of a VRRP packet. The techniques may be executed in a router using hardware, software, firmware, or various combinations. If embodied in software, the invention may be directed to a computer readable medium comprising executable instructions that cause the router to carry out the techniques. In addition, the invention may be directed to a computer readable medium storing a data structure, e.g., a VRRP packet, that includes a zero value in an advertisement interval field to indicate a sub-second interval. In those cases, the computer readable medium may comprise random access memory (RAM), read-only memory (ROM), non-volatile random access memory (NVRAM), electrically erasable programmable read-only memory (EEPROM), flash memory, and the like.

In addition, other techniques could also be used to create a sub-second time interval without departing from the spirit and scope of the invention. For example, rather than define intervals in units of seconds, as defined in RFC 2338, the protocol could be changed to specify intervals in units of milliseconds, tens of milliseconds, hundreds of milliseconds, or the like. In other words, the protocol could be changed from that of RFC 2338 in order to define different units of the advertisement interval field. Alternatively, specific non-zero values in the advertising interval field may be assigned specific sub-second values by programming such values into the routers of the virtual routing systems. In those cases, however, the router would be generally non-compatible with other RFC 2338 compliant routers even if intervals were defined to be larger than one second. Nevertheless, these and other embodiments are within the scope of the following claims.

The invention claimed is:

1. A system comprising:
 a plurality of routers forming a virtual routing system within a packet-based network for routing of packets related to a real-time application,
 wherein the routers exchange timing information that specifies a time value for detecting a failure in accordance with a network protocol, and
 wherein at least one of the routers is configured to detect the failure using a time interval of less than one second when the time value specified by the timing information is not defined by the network protocol.

2. The system of claim 1, wherein the real-time application comprises a real-time packet-based voice application.

3. The system of claim 1, wherein the router detects the failure using a time interval less than a lowest time interval defined by the network protocol when the time value specified by the timing information is not defined by the network protocol.

4. The system of claim 1, wherein the time value not defined by the network protocol comprises a value of zero.

5. The system of claim 1, wherein the router detects the failure by:
 timing one or more sub-second time intervals when the time value specified by the timing information is undefined by the network protocol; and
 detecting failure upon failing to receive a packet from the network device within the sub-second intervals.

6. The system of claim 5, wherein the router further detects failures by:
 timing one or more intervals having durations in integer seconds when the time value specified by the timing information is defined by the network protocol; and
 detecting failure upon failing to receive a packet from the network device within the integer time intervals.

7. The system of claim 1, wherein the first router transmits timing information in accordance with a virtual router redundancy protocol (VRRP).

* * * * *